United States Patent
Merlin et al.

(10) Patent No.: US 10,033,485 B2
(45) Date of Patent: Jul. 24, 2018

(54) MANAGING ACKNOWLEDGEMENT MESSAGES FROM MULTIPLE DESTINATIONS FOR MULTI USER MIMO TRANSMISSIONS

(75) Inventors: Simone Merlin, San Diego, CA (US); Maarten Menzo Wentink, Naarden (NL); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 13/216,365

(22) Filed: Aug. 24, 2011

(65) Prior Publication Data

US 2012/0213308 A1 Aug. 23, 2012

Related U.S. Application Data

(60) Provisional application No. 61/376,962, filed on Aug. 25, 2010.

(51) Int. Cl.
*H04L 1/16* (2006.01)
*H04L 1/18* (2006.01)

(52) U.S. Cl.
CPC .......... *H04L 1/1621* (2013.01); *H04L 1/1685* (2013.01); *H04L 1/1887* (2013.01); *H04L 1/1896* (2013.01)

(58) Field of Classification Search
CPC ............ H04L 12/1868; H04L 12/5695; H04L 1/0045; H04L 1/1621; H04L 1/1628; H04L 1/1854; H04L 5/023; H04W 72/005; H04W 72/04; H04W 72/0446; H04W 72/1289; H04W 88/02

USPC ....... 370/328–335, 477, 469, 312, 338, 229, 370/252, 445
See application file for complete search history.

(56) References Cited

U.S. PATENT DOCUMENTS

| | | | |
|---|---|---|---|
| 7,995,656 B2 | 8/2011 | Chen et al. | |
| 8,085,806 B2 * | 12/2011 | Boer | H04L 27/0012 370/445 |
| 8,306,010 B2 * | 11/2012 | Gong | H04L 1/1685 370/346 |

(Continued)

FOREIGN PATENT DOCUMENTS

| | | |
|---|---|---|
| CN | 101668338 A | 3/2010 |
| CN | 101808385 A | 8/2010 |

(Continued)

OTHER PUBLICATIONS

Wentink, Maarten Menzo, Sequential ACK for Multi-User Transmission, U.S. Appl. No. 61/327,575, filed Apr. 23, 2010.*

(Continued)

*Primary Examiner* — Sai Aung
(74) *Attorney, Agent, or Firm* — Patterson & Sheridan, LLP

(57) ABSTRACT

Certain aspects of the present disclosure generally relate to apparatus and methods for managing acknowledgement messages from multiple destinations for multi-user multiple-input multiple-output (MU-MIMO) transmissions. According to certain aspects, a polled block acknowledgement (BA) mechanism can be considered mandatory to an acknowledgement protocol, and a sequential (or other type of scheduled/deterministic) mechanism can be considered optional.

44 Claims, 7 Drawing Sheets

(56) References Cited

U.S. PATENT DOCUMENTS

| | | | |
|---|---|---|---|
| 8,548,056 | B2 | 10/2013 | Sagetong et al. |
| 2005/0068979 | A1 | 3/2005 | Boer et al. |
| 2005/0238016 | A1 | 10/2005 | Nishibayashi et al. |
| 2005/0265281 | A1 | 12/2005 | Ketchum |
| 2005/0270975 | A1* | 12/2005 | Meylan ............... H04L 47/14 370/229 |
| 2006/0050742 | A1* | 3/2006 | Grandhi et al. ............ 370/506 |
| 2006/0092871 | A1* | 5/2006 | Nishibayashi ........ H04L 1/1671 370/328 |
| 2006/0227801 | A1* | 10/2006 | Nanda ................ H04L 47/15 370/447 |
| 2007/0211667 | A1* | 9/2007 | Agrawal ............ H04W 72/14 370/335 |
| 2008/0062944 | A1* | 3/2008 | Smith ................ H04L 1/1812 370/342 |
| 2008/0095091 | A1* | 4/2008 | Surineni .......... H04W 52/0225 370/311 |
| 2008/0212696 | A1* | 9/2008 | Takahashi ............ H04L 1/0045 375/260 |
| 2009/0052363 | A1 | 2/2009 | Matsue et al. |
| 2009/0252100 | A1 | 10/2009 | Sridhara et al. |
| 2010/0002640 | A1 | 1/2010 | Gorokhov et al. |
| 2010/0014448 | A1 | 1/2010 | Wentink et al. |
| 2010/0046540 | A1* | 2/2010 | Nishibayashi et al. ....... 370/445 |
| 2010/0177657 | A1* | 7/2010 | Kim et al. .................... 370/252 |
| 2010/0177757 | A1* | 7/2010 | Kim ................ H04W 74/0816 370/338 |
| 2011/0075607 | A1 | 3/2011 | Kim et al. |
| 2011/0090855 | A1* | 4/2011 | Kim ............................ 370/329 |
| 2011/0096710 | A1* | 4/2011 | Liu ...................... H04L 1/1614 370/312 |
| 2011/0222486 | A1* | 9/2011 | Hart ...................... H04L 5/001 370/329 |
| 2011/0261742 | A1* | 10/2011 | Wentink ....................... 370/312 |
| 2012/0155424 | A1* | 6/2012 | Kim et al. ................... 370/330 |

FOREIGN PATENT DOCUMENTS

| | | |
|---|---|---|
| JP | 2005110245 A | 4/2005 |
| JP | 2005311920 A | 11/2005 |
| JP | 2008017306 A | 1/2008 |
| JP | 2009049704 A | 3/2009 |
| WO | 2005067169 A2 | 7/2005 |
| WO | WO-2006099221 A2 | 9/2006 |
| WO | WO-2008052024 A2 | 5/2008 |
| WO | WO-2008086324 A1 | 7/2008 |
| WO | WO-2010009046 A1 | 1/2010 |
| WO | WO-2011025769 A1 | 3/2011 |

OTHER PUBLICATIONS

Gong et al. "Training Protocols for Multi-User MIMO Wireless LANs", in IEEE International Symposium on Personal Indoor Radio Communications (PIMRC), pp. 1218-1223, Sep. 2010.
IEEE 802.11, IEEE Standard for Information technology—Telecommunications and information exchange between systems— Local and metropolitan area networks—Specific requirements; Part 11: Wireless LAN Medium Access Control (MAC) and Physical Layer (PHY), 2007.
IEEE P802.11ac/D1.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHZ, May 2011.
IEEE STD 802.11n-2009, "IEEE Standard for Information Technology—Telecommunications and Ifnormation Exchange Between Systems—Local and Metropolitan Area Networks—Specific Requirements", Part 11: Wireless Lan Medium Access Control (MAC) and Physical Layer (PHY) Specifications, Amendment 5: Enhancements for Higher Throughput pp. 1-536 (Oct. 29, 2009).
Merlin et al., "ACK Protocols for MU-MIMO" Qualcomm Incorporated, Slides 1-10, (2010).
Co-pending U.S. Appl. No. 13/338,755, filed Dec. 28, 2011.
Co-pending U.S. Appl. No. 13/338,764, filed Dec. 28, 2011.
Gong et al.,"DL MU MIMO Error Handling and Simulation Results", IEEE 802.11 No.-IEEE 802.11-10/0324r0 Mar. 15, 2010 (Mar. 15, 2010), pp. 1-22, XP002649355, Retrieved from the Internet: URL: https://mentor.ieee.org/802.11/dcn/10/ 11-10-0324-00-00ac-dl-mu-mimo-error-handling-and-simulation. ppt [retrieved on Jul. 11, 2011].
International Search Report and Written Opinion—PCT/US2011/049226, ISA/EPO—Oct. 7, 2011.
Kim et al., "GroupID Concept for Downlink MU-MIMO Transmission", Jan. 18, 2010 (Jan. 18, 2010), pp. Slide 1-Slide 8, XP002645417, Retrieved from the Internet: URL:https://mentor.ieee.org/.../11-10, 0073 -00-00ac-group-id-concept-for-dl-mu-mimo.p. pt [retrieved on Jun. 28, 2011].
Zhu et al., "TXOP Enhancement for DL MU-MIMO Support, doc IEEE 802.11-10/0591r0", IEEE 802.11, May 17, 2010 (May 17, 2010), pp. 1-13, XP55008058, Retrieved from the Internet: URL:https://mentor.ieee.org/802.11/documents"isdcn=591 &is_group=00ac [retrieved on Sep. 26, 2011].
Abu-Surra., et al., "PHY/MAC Complete Proposal Specification," IEEE 802.11-10/0433r2, IEEE, URL: https://mentor.ieee.org/802.11/dcn/10/11-10-0433-02-00ad-cp specification .docx, May 2010, p. 139, 153, 154.
Gong et al., "DL MU MIMO Analysis and OBSS Simulation Results", IEEE 802.11, May 15, 2010, pp. 1-22, XP002649356, Retrieved from the Internet : URL: https://mentor.ieee.org/802.11/dcn/10/11-10-0567-00-00ac-dl-mu-mimo-analysis-and -obss-simulation.pptx [retrieved on Jul. 11, 2011].
Kim J., et al., "GroupID Concept for Downlink MU-MIMO Transmission", IEEE 802.11-10/0073r2, IEEE mentor, Mar. 2010 Slide Show; pp. 1-10.
Kim Y.J, "Error Recovery Scheme for Scheduled Ack," IEEE 802.11-10/0637r0, IEEE, URL:https://mentor.ieee.org/802.11/dcn/10/11-10-0637 00-00ac-error-recovery-scheme-for-scheduled-ack.ppt, May 2010, 12 pages.
Stacey R., et al., "DL MU-MIMO ack Protocol", IEEE 802.11-09/1172r0, IEEE,< URL: https://mentor.ieee.org/802.11/dcn/09/11-09-1172-00-00ac-dl-mu-mimo-ack-protocol.ppt>, Nov. 2009, 8 Pages.

* cited by examiner

MANAGING ACKNOWLEDGEMENT MESSAGES FROM MULTIPLE DESTINATIONS FOR MULTI USER MIMO TRANSMISSIONS

CLAIM OF PRIORITY UNDER 35 U.S.C. § 119

The present Application for Patent claims benefit of U.S. Provisional Patent Application Ser. No. 61/376,962, entitled, "Managing acknowledgement messages from multiple destinations for MU-MIMO", filed Aug. 25, 2010 and assigned to the assignee hereof and hereby expressly incorporated by reference herein.

BACKGROUND

Field

Certain aspects of the present disclosure generally relate to apparatus and methods for managing acknowledgement messages from multiple destinations for multi-user multiple-input multiple-output (MU-MIMO) transmissions.

Background

In order to address the issue of increasing bandwidth requirements that are demanded for wireless communications systems, different schemes are being developed to allow multiple user terminals to communicate with a single access point by sharing channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a first circuit configured to generate a plurality of Data Units (DUs), and a transmitter configured to transmit a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message.

Certain aspects of the present disclosure provide a method for wireless communications. The method generally includes generating a plurality of Data Units (DUs), and transmitting a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message.

Certain aspects of the present disclosure provide an apparatus for wireless communications. The apparatus generally includes means for generating a plurality of Data Units (DUs), and means for transmitting a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message.

Certain aspects of the present disclosure provide a computer-program product for wireless communications. The computer-program product generally includes a computer-readable medium comprising instructions executable to generate a plurality of Data Units (DUs), and transmit a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message.

Certain aspects of the present disclosure provide an access point. The access point generally includes at least one antenna, a first circuit configured to generate a plurality of Data Units (DUs), and a transmitter configured to transmit, via the at least one antenna, a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message.

Certain aspects of the present disclosure provide an apparatus for wireless communications. The apparatus generally includes a receiver configured to receive a Data Unit (DU) transmitted with one or more other DUs, wherein acknowledgement policies for the DUs are set to cause no more than a first apparatus of a plurality of apparatuses associated with the DUs to respond with an acknowledgement, and a first circuit configured to determine timing of transmitting an acknowledgement message based on one of the acknowledgement policies for the DU associated with the apparatus.

Certain aspects of the present disclosure provide a method for wireless communications. The method generally includes receiving, at an apparatus, a Data Unit (DU) transmitted with one or more other DUs, wherein acknowledgement policies for the DUs are set to cause no more than a first apparatus of a plurality of apparatuses associated with the DUs to respond with an acknowledgement, and determining timing of transmitting an acknowledgement message based on one of the acknowledgement policies for the DU associated with the apparatus.

Certain aspects of the present disclosure provide an apparatus for wireless communications. The apparatus generally includes means for receiving a Data Unit (DU) transmitted with one or more other DUs, wherein acknowledgement policies for the DUs are set to cause no more than a first apparatus of a plurality of apparatuses associated with the DUs to respond with an acknowledgement, and means for determining timing of transmitting an acknowledgement message based on one of the acknowledgement policies for the DU associated with the apparatus.

Certain aspects of the present disclosure provide a computer-program product for wireless communications. The computer-program product generally includes a computer-readable medium comprising instructions executable to receive, at an apparatus, a Data Unit (DU) transmitted with one or more other DUs, wherein acknowledgement policies for the DUs are set to cause no more than a first apparatus of a plurality of apparatuses associated with the DUs to respond with an acknowledgement, and determine timing of transmitting an acknowledgement message based on one of the acknowledgement policies for the DU associated with the apparatus.

Certain aspects of the present disclosure provide an access terminal. The access terminal generally includes at least one antenna, a receiver configured to receive, via the at least one antenna, a Data Unit (DU) transmitted with one or more other DUs, wherein acknowledgement policies for the DUs are set to cause no more than a first access terminal of a plurality of access terminals associated with the DUs to respond with an acknowledgement, and a first circuit configured to determine timing of transmitting an acknowledgement message based on one of the acknowledgement policies for the DU associated with the access terminal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
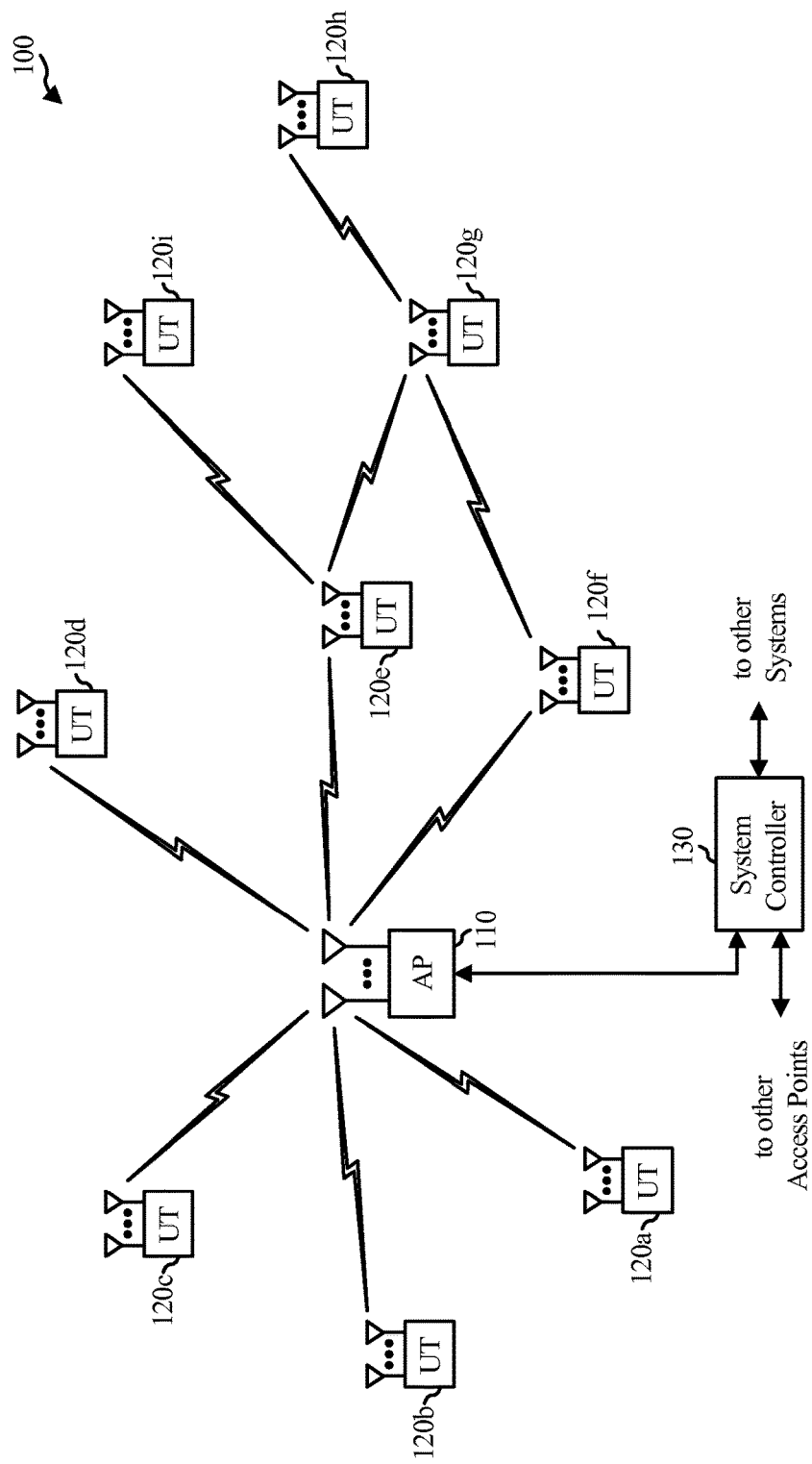
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

The wireless system 100 illustrated in FIG. 1 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple stations 120 at once, or by using a wider channel bandwidth (e.g., 80 MHz or 160 MHz). The IEEE 802.11ac is also referred to as Very High Throughput (VHT) wireless communications standard.

Figure 2:
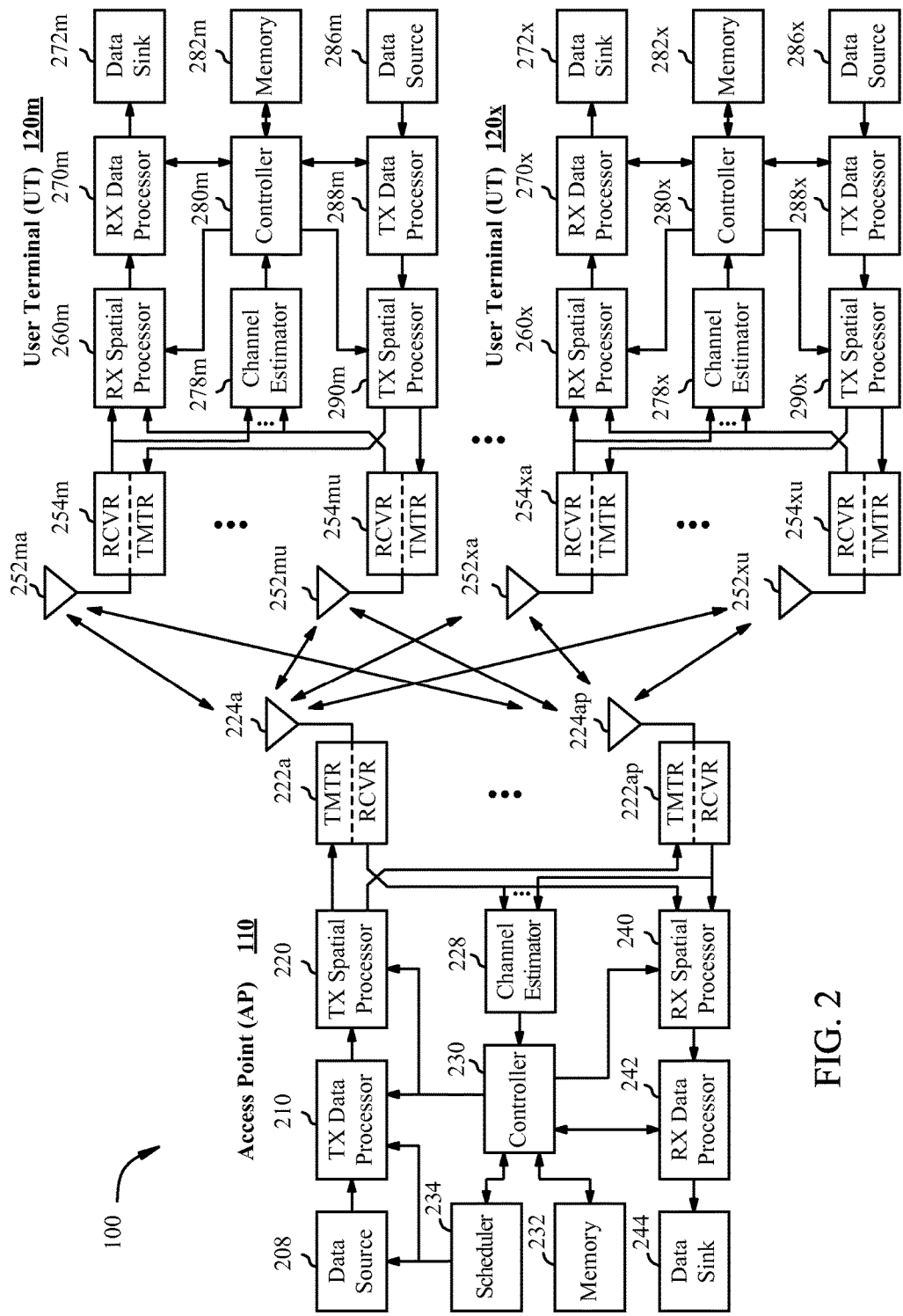
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the modulation and coding schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain aspects of the present disclosure support managing acknowledgement messages transmitted from multiple user terminals 120 in response to multi-user multiple-input multiple-output (MU-MIMO) transmissions from an access point 110. According to certain aspects, a polled block acknowledgement (BA) mechanism can be considered mandatory to an acknowledgement (ACK) protocol, and a sequential (or other type of scheduled/deterministic) mechanism can be considered optional.

Figure 3:
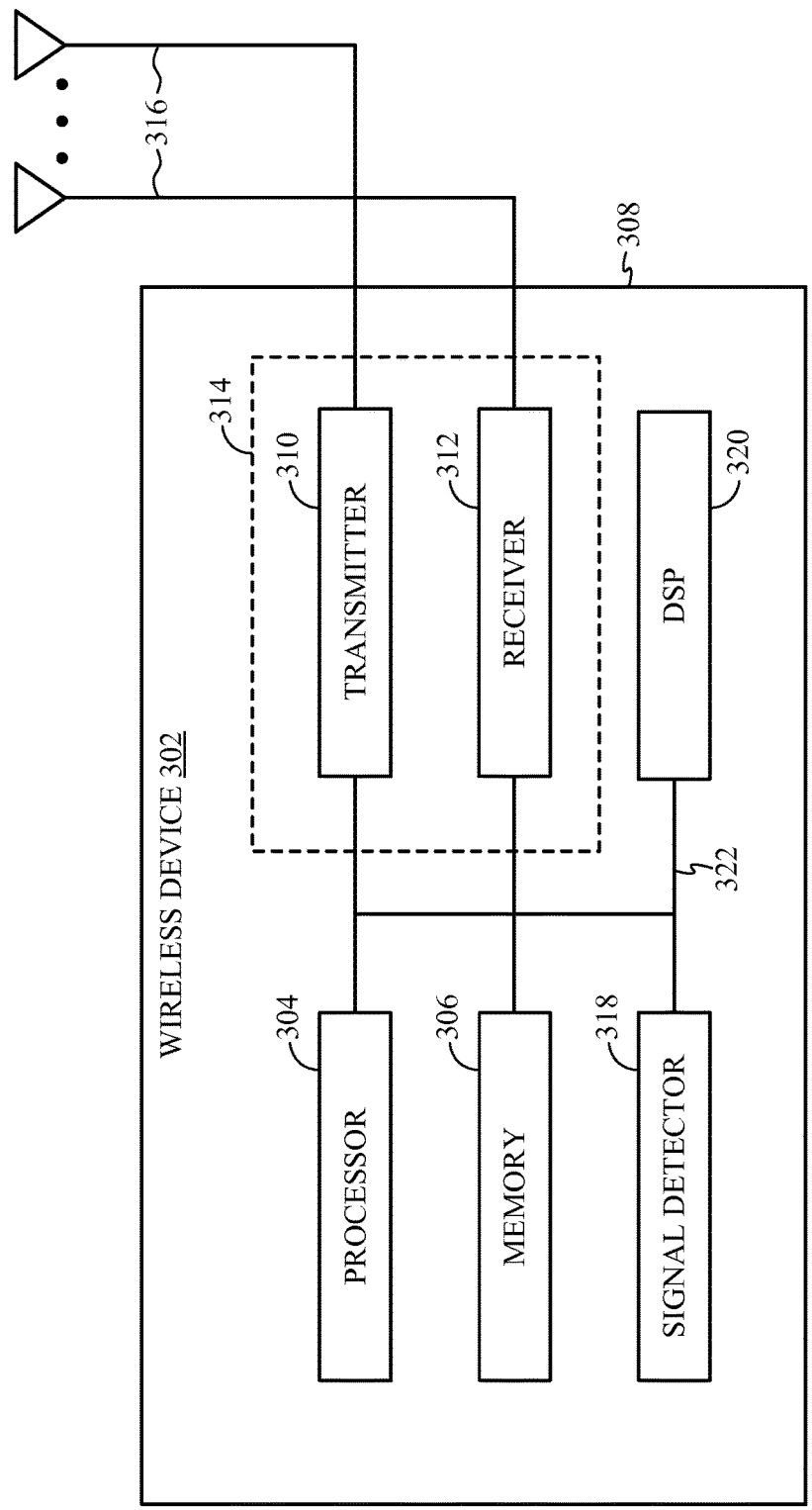
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The present disclosure support managing ACK messages transmitted from the wireless device 302 in response to MU-MIMO transmissions from an access point (not shown in FIG. 3) serving the wireless device 302. The wireless device 302 may correspond to one of user terminals receiving the MU-MIMO transmission. According to certain aspects, a polled BA mechanism can be considered mandatory to an ACK protocol, and a sequential (or other type of scheduled/deterministic) mechanism can be considered optional.

The various components of the wireless device 302 may be coupled together by a bus system 322, which may include a power bus, a control signal bus, and a status signal bus in addition to a data bus.

In next generation Wireless Local Area Networks (WLANs), such as the WLAN 100 from FIGS. 1-2, downlink (DL) MU-MIMO transmission may represent a promising technique to increase overall network throughput. In most aspects of a DL MU-MIMO transmission, a non-beamformed portion of a preamble transmitted from an access point (e.g., the access point 110 from FIGS. 1-2 or the wireless device 302 from FIG. 3) to a plurality of user stations (e.g., the user terminals 120 from FIGS. 1-2) may carry a spatial stream allocation field indicating allocation of spatial streams to the stations (STAs).

In order to parse this allocation information at a station (STA) side, each STA may need to know its ordering or a STA number in a set of STAs from the plurality of STAs scheduled to receive the MU-MIMO transmission. This may entail forming groups, wherein a group identification (groupID) field in the preamble may convey, to the STAs, the set of STAs (and their order) being transmitted in a given MU-MIMO transmission. With preamble bits adding to the transmission overhead, it may be desirable to expend as little bits on the groupID as possible, while not sacrificing on the flexibility with which STAs can be scheduled together in a MU-MIMO transmission at a given instant.

Managing Acknowledgement Messages from Multiple Destinations for MU-MIMO Transmission The present disclosure provides protocols for acknowledging MU-MIMO data transmissions. The various protocols presented herein may include polled, sequential and scheduled acknowledgements, as well as various combinations of the same.

According to certain aspects of the present disclosure, a polled block acknowledgement (BA) mechanism may be considered mandatory to an acknowledgement (ACK) protocol. According to certain aspects, a sequential (or other type of scheduled/deterministic) mechanism may be considered optional to an ACK protocol.

A polled BA protocol may operate, in some ways, in a similar manner to existing acknowledgment mechanisms and "Multiple Frames" transmission rules, but with some additional constraints presented herein. As an example, a Multi User Physical layer convergence procedure Protocol Data Unit (MU-PPDU) may comprise one of the following combinations of data.

In one aspect of the present disclosure, Quality of Service (QoS) Control field acknowledgement policy bits 5-6 of an Aggregated Media access control Protocol Data Unit (A-MPDU) for one of STAs may be set to '00' referring to "Implicit Block Acknowledgement Request (BAR)" policy, while these bits may be set to '11' for destination STAs with "Wait for BAR" policy or to '10' for "No-ACK" policy. In another aspect, QoS Control field acknowledgement policy bits 5-6 of the A-MPDU with Non QoS data may be set to '00' for one of the STAs requiring Normal A-MPDUs, and these bits may be set to '11' for destination STAs with "Wait for BAR" policy, or to '10' for "No-ACK" policy. In yet another aspect, all A-MPDUs may comprise QoS Control field acknowledgement policy bits 5-6 set to '10' for "No-ACK" policy.

Certain rules may be applied to ensure that at least one STA requires an immediate ACK or BA, unless ACK policies for all data are set to a value indicating No-ACK (e.g., no ACK is to be sent). According to certain aspects presented herein, it may be desirable to avoid setting ACK policies (for all MAC protocol data units (MPDUs) in a MU-MIMO transmission) that would result in all STAs having delayed block ACK, as this may not allow collision detection on the MU-PPDU itself.

According to certain aspects, an immediate BA may be set for the same STA until correct reception of an ACK (or block acknowledgement "BA") transmitted from the STA. After reception of a BA, an immediate BA message should be set for a different STA.

Figure 4:
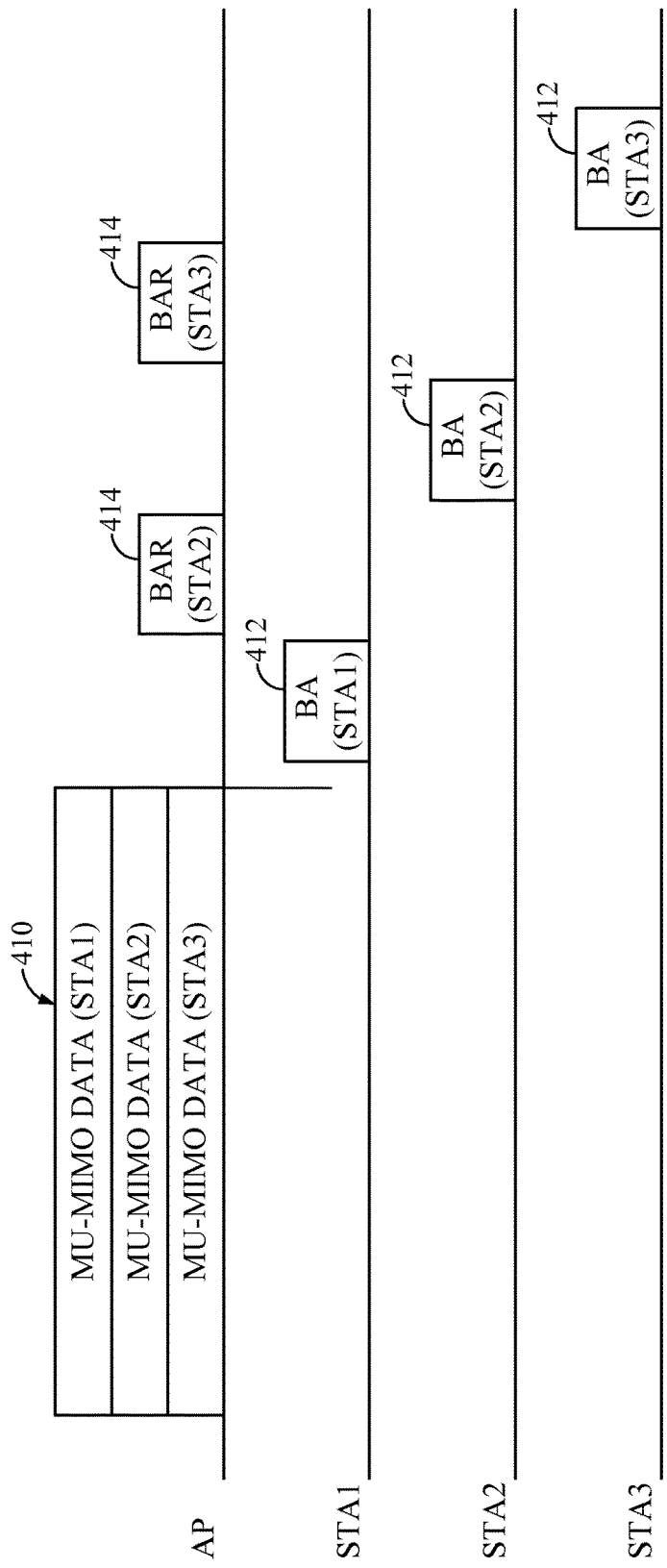
FIG. 4 illustrates an example multi-user multiple-input multiple-output (MU-MIMO) exchange in accordance with certain aspects of the present disclosure.

According to certain aspects, an AP may poll all STAs (other than the one for which "Implicit Block ACK Request" or "Normal ACK" is set), by transmitting BAR messages. In such cases, the AP may commence transmission of a BAR frame Short Inter-Frame Space (SIFS) after the correct reception of the immediately preceding ACK or BA. This is illustrated in FIG. 4. As illustrated, an AP may transmit multiple MPDUs via a MU-MIMO transmission 410. The ACK policies may be set such that STA1 transmits an immediate acknowledgement message 412 (ACK), while STA2 and STA3 transmit their ACK messages 412 only after receiving BAR messages 414.

According to certain aspects, Enhanced Distributed Coordinated Access (EDCA) rules may define various ways of transmitting multiple frames back to back in a transmission opportunity (TxOP). As an example, if the first frame exchange is successful (either a No-ACK frame or a frame with successful ACK), an AP may be allowed to keep transmitting frames with SIFS separation after each successful exchange, or with Point coordination function Inter-Frame Space (PIFS) separation after each failed exchange.

If the first frame exchange fails, then the AP may not be allowed to keep transmitting frames (i.e., the AP did not gain the TxOP).

Such rules may help ensure compliance with EDCA rules and may imply that if a first frame exchange was successful (i.e., the immediate BA is correctly received, or a Request-to-send Clear-to-send (RTS-CTS) exchange before the MU-MIMO PPDU is correct), then a BAR message may be transmitted a SIFS period after the first ACK or BA. Otherwise, if the first frame exchange failed (i.e., the immediate BA may not be received), then BAR messages may not be transmitted.

According to certain aspects, a missing acknowledgement message (e.g., BA) expected to be received from a primary STA may trigger a failure event (indicating collision detection). According to certain aspects, in a polled scheme, the primary STA may be the one for which an immediate BA message or a Normal ACK message is requested. In this case, a missing immediate BA or ACK from the primary STA may trigger the failure event for the primary Access Category (AC) of the MU transmission. Various rules may define that if the first frame exchange fails (i.e., a BA is missing), then a contention window (CW) may be increased.

It should be noted that a BAR can be typically associated with a BA as its response and, hence, the BAR may not be utilized for collision detection on the MU-PPDU itself (it can detect collision on the BAR itself). Thus, a polled scheme with no immediate BA may not detect collision on MU-PPDU.

An immediate BA may require each MPDU to carry an indication in its QoS field. According to certain aspects, once data for a destination are associated with a QoS policy, retransmissions may utilize the same policy. When transmitting to different 'partially overlapping' groups of user STAs in two subsequent transmissions, it might happen that (retransmitted) data for more than one destination are associated with immediate BA policy, which cannot be allowed. According to certain aspects, capability to set the BA policy per each transmission independently may be desirable, which may imply a change to the packet and cyclic redundancy check (CRC) at the last moment.

According to certain aspects, the immediate BA may be tied to (associated with) the 'first' position in the MU group. This may effectively restrict the STAs that will return the ACK. As an example, if there is only one group with four STAs, only one group may be created: collision detection will be done always for the same STA.

Figure 5:
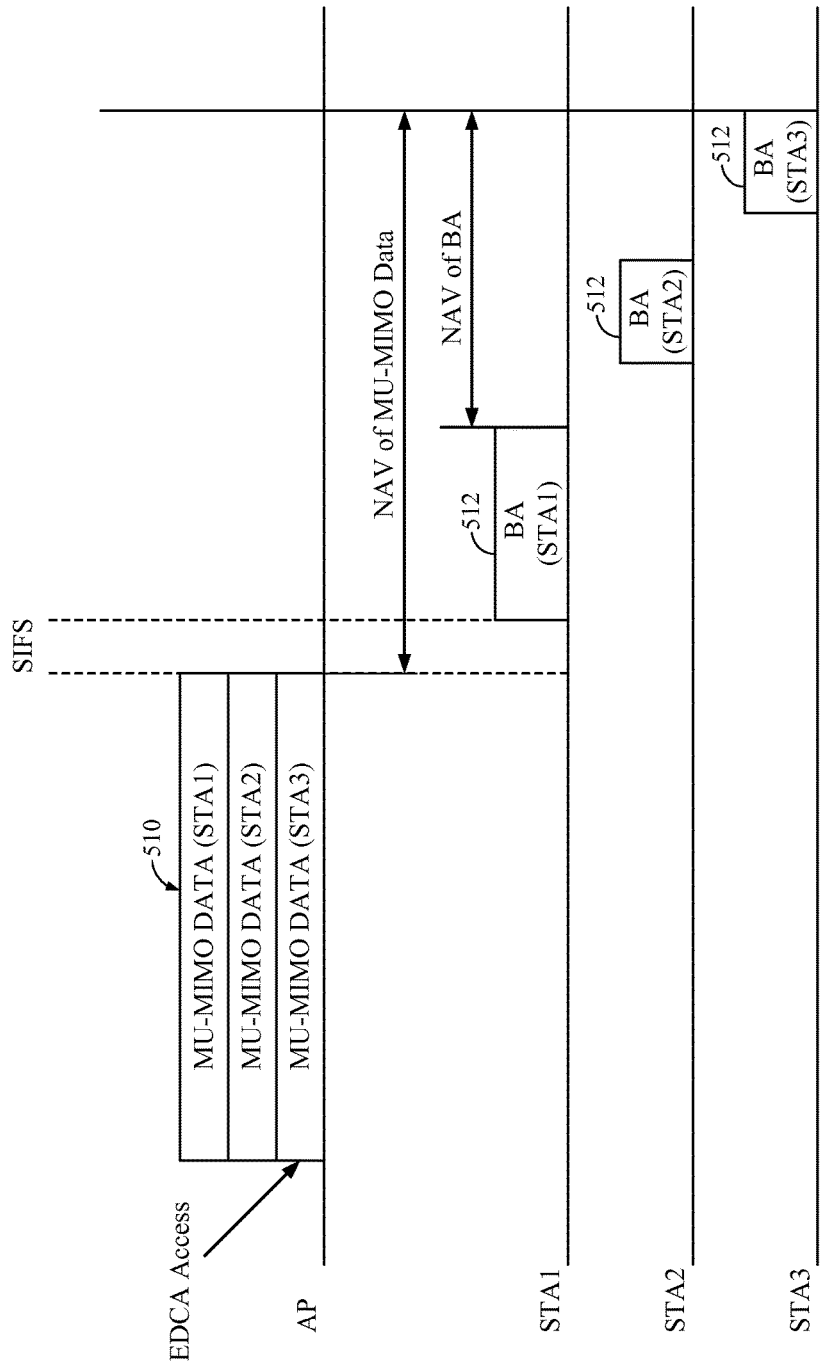
FIG. 5 illustrates another example MU-MIMO exchange in accordance with certain aspects of the present disclosure.

According to certain aspects, a STA in position 1 in the group may follow an implicit BA mechanism and transmit BA SIFS after DL transmission. In this case, a STA in a position n may count the number of received PPDU with valid Legacy Signal (L-SIG) field after the end of the MU-PPDU transmission, and transmit its BA frame SIFS time after the end of the transmission of the (n−1)-th frame. This is illustrated in FIG. 5. As illustrated, an AP may transmit multiple MPDUs via a MU-MIMO transmission 510. In this case, each STA may transmit its acknowledgement message 512 (ACK) sequentially based on its position.

According to certain aspects, if a PHY-RXSTART.indication does not occur during the period of SIFS+aPHY-RX-START-Delay time following the end of a previous frame, then the STA may conclude that the sequential BA scheme failed and may not transmit the BA.

According to certain aspects, if a PPDU is detected but an L-SIG field is not valid, then the STA may conclude that the sequential BA scheme failed and may not transmit the BA. In an aspect, a STA receiving a frame of type BA may abort the sequential procedure.

At the AP, if a PHY-RXSTART.indication does not occur during the period of SIFS+aPHY-RX-START-Delay time following the PHY-TXEND.confirm referred to the MU-MPU transmission, or following the PHY-RXEND.indication referred to a valid BA, then the AP may conclude that the sequential BA scheme failed and may continue by following the rules of polled scheme to retrieve the BA. It can be noted that certain rules may not allow an AP to poll for a second STA if the first ACK is missing.

If a STA is not supposed to return an ACK or BA, an AP may transmit a filler frame after a SIFS time. In this case, the AP may know the STA is not supposed to return an ACK. In an aspect, the filler frame could be an ACK, and frame counting at the STA may not be modified.

According to certain aspects, if there is a break in a chain of sequential ACKs, an AP may have no way to poll for a Normal ACK later on. Possible solutions may include: not allowing Normal ACK with sequential ACKs, only allowing Normal ACK for a STA in position 1, and/or defining a new polling mechanism for normal ACK.

According to certain aspects, a STA in position 1 may follow the implicit BA mechanism and transmit BA SIFS after DL transmission. A STA in a position n may count the number of correctly received frames of type ACK or BA after the end of the MU-PPDU transmission, and may transmit its ACK or BA frame SIFS time after the end of the transmission of the (n−1)-th frame.

If a PHY-RXSTART.indication does not occur during the period of SIFS+aPHY-RX-START-Delay time following the end of a previous frame, then the STA may conclude that the sequential BA scheme failed and may not transmit the BA. If a frame is detected but FCS fails or the frame is not of type ACK or BA, then the STA may conclude that the sequential BA scheme failed and may not transmit the ACK or BA. In an aspect, a STA receiving a frame of type BA may abort the sequential procedure.

At the AP, according to certain aspects, if a PHY-RXSTART.indication does not occur during the period of SIFS+aPHY-RX-START-Delay time following the PHY-TXEND.confirm referred to the MU-MPU transmission, or following the PHY-RXEND.indication referred to a valid ACK or BA, then the AP may conclude that the sequential BA scheme failed and may continue according to the rules defined for polled scheme to retrieve the BAs.

Figure 6:
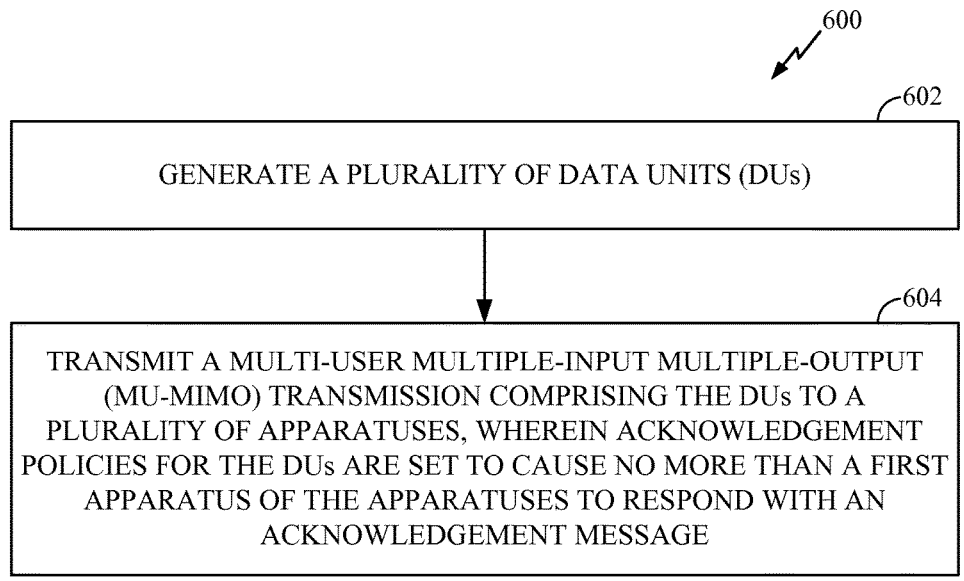
FIG. 6 illustrates example operations that may be performed at an access point in accordance with certain aspects of the present disclosure.

FIG. 6 illustrates example operations 600 that may be performed at an access point (AP) in accordance with certain aspects of the present disclosure. The operations begin, at 602, by generating a plurality of Data Units (DUs). The operations 600 continue, at 604, by transmitting a multi-user multiple-input multiple-output (MU-MIMO) transmission comprising the DUs to a plurality of apparatuses, wherein acknowledgement policies for the DUs may be set to cause no more than a first apparatus of the apparatuses to respond with an acknowledgement message. In an aspect, the plurality of DUs may comprise a plurality of Media access control Protocol Data Units (MPDUs).

In an aspect, the AP may assign at least one of the apparatuses a position within a group, wherein which apparatus is the first apparatus may be determined based on the position of that apparatus in the group. The AP may transmit a Block Acknowledgement Request (BAR) message to at least one apparatus that is not assigned another position in the group. Further, the AP may be also configured to generate the plurality of DUs of at least one of a primary access category or secondary access categories.

In an aspect, the AP may detect that an acknowledgement from one of the apparatuses is missing (e.g., from the first apparatus), if a PHY-RXSTART indication is not detected at the AP during a time period after transmission of the DUs. It should be noted that this time period may be specific for that one apparatus.

In an aspect, an acknowledgement policy for a DU of the plurality of DUs of the primary access category may be set for a Normal ACK. In this case, the acknowledgement message may comprise the Normal ACK.

Figure 7:
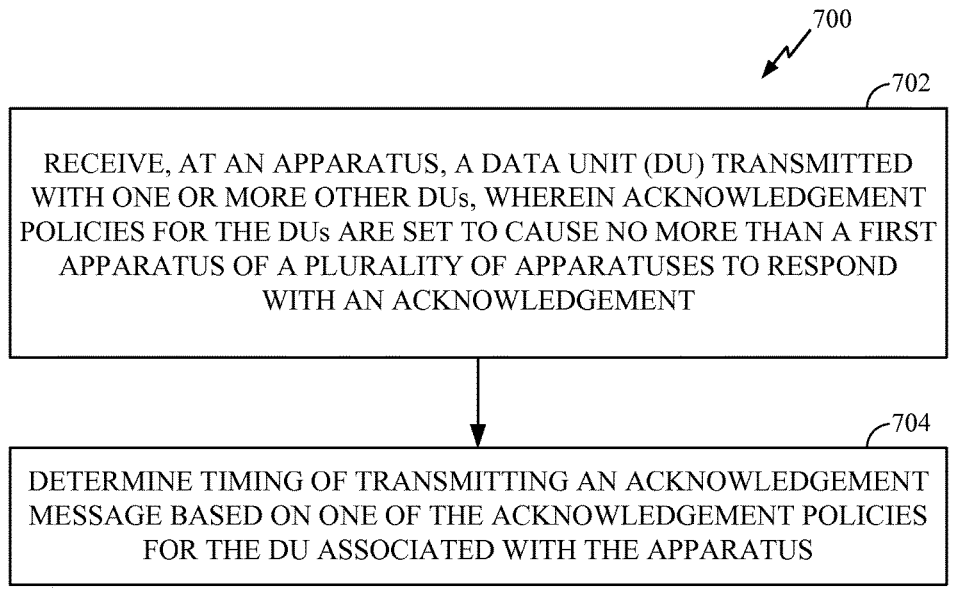
FIG. 7 illustrates example operations that may be performed at an access terminal in accordance with certain aspects of the present disclosure.

FIG. 7 illustrates example operations 700 that may be performed at an access terminal (AT) in accordance with certain aspects of the present disclosure. The operations 700 begin, at 702, by receiving, at an apparatus (AT), a Data Unit (DU) transmitted with one or more other DUs, wherein acknowledgement policies for the DUs may be set to cause no more than a first apparatus of a plurality of apparatuses associated with the DUs to respond with an acknowledgement. At 704, timing of transmitting an acknowledgement message based on one of the acknowledgement policies for the DU associated with the apparatus may be determined. In an aspect, the DU may comprise a Media access control Protocol Data Unit (MPDU), and the one or more other DUs may comprise one or more other MPDUs.

In an aspect, the AT may receive an assignment of a position of the apparatus within a group. The timing of transmitting the acknowledgement message may be determined based on the assigned position in the group. The AT may determine a sequential order in which to transmit the acknowledgement message relative to acknowledgement messages transmitted by apparatuses with other assigned positions in the group.

In one aspect of the present disclosure, the AT may decide not to transmit the acknowledgement message, if a Legacy Signal (L-SIG) field of the DU is not valid. In another aspect, the AT may decide not to transmit the acknowledgement message, if a PHY-RXSTART indication is not detected at the AT during a time period following an end of transmission of a specific number of frames from an AP transmitting the DUs. In yet another aspect, the AT may decide not to transmit the acknowledgement message, if one or more other acknowledgement messages associated with one or more of the apparatuses are not detected on a medium over which the one or more other DUs were transmitted. In yet another aspect, the AT may refrain from transmitting the acknowledgement message to the AP, if the DU transmitted with the one or more other DUs has not been detected on a medium but one or more acknowledgement messages corresponding to the one or more other DUs are detected on the medium. In yet another aspect, the AT may decide to wait for a Block Acknowledgement Request (BAR) before transmitting the acknowledgement message.

Figure 6A:
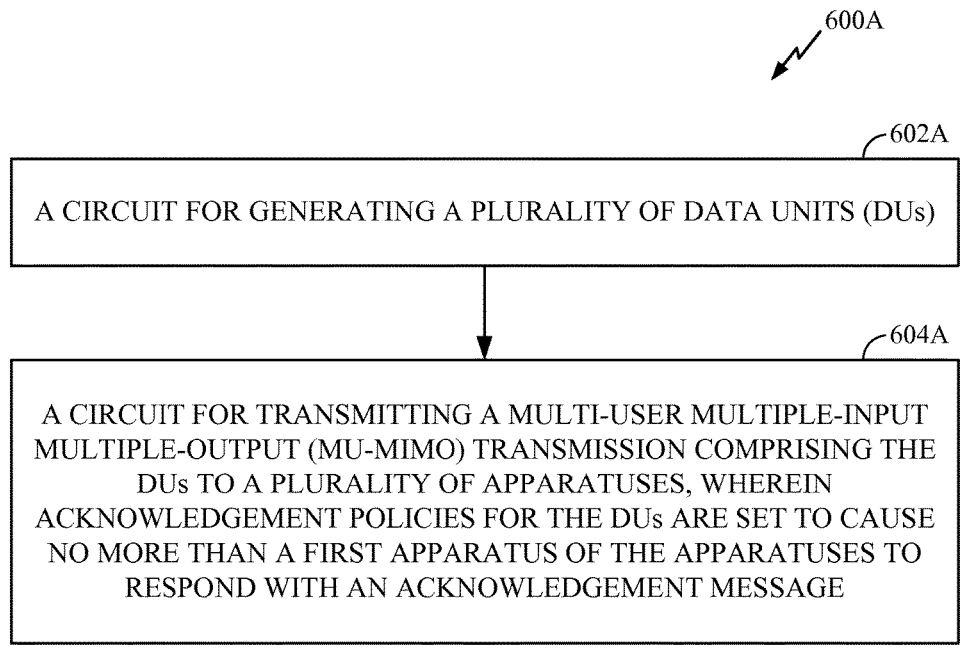
FIG. 6A illustrates example means capable of performing the operations shown in FIG. 6.
Figure 7A:
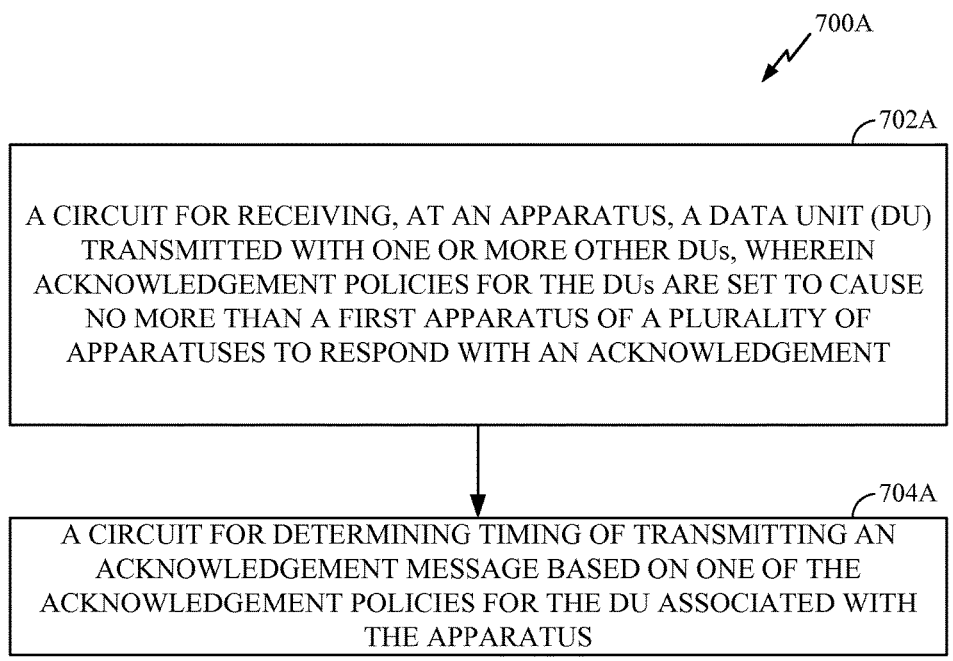
FIG. 7A illustrates example means capable of performing the operations shown in FIG. 7.

The various operations of methods described above may be performed by any suitable means capable of performing the corresponding functions. The means may include various hardware and/or software component(s) and/or module (s), including, but not limited to a circuit, an application specific integrate circuit (ASIC), or processor. Generally, where there are operations illustrated in Figures, those operations may have corresponding counterpart means-plus-function components with similar numbering. For example, operations 600 and 700 illustrated in FIGS. 6 and 7 correspond to components 600A and 700A illustrated in FIGS. 6A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for generating may comprise an application specific integrated circuit, e.g., the processor 210 from FIG. 2 of the access point 110, or the processor 304 from FIG. 3 of the wireless device 302. The means for transmitting may comprise a transmitter, e.g., the transmitter 222 from FIG. 2 of the access point 110, or the transmitter 310 from FIG. 3 of the wireless device 302. The means for detecting may comprise an application specific integrated circuit, e.g., the processor 242 from FIG. 2 of the access point 110, or the processor 304. The means for assigning may comprise an application specific integrated circuit, e.g., the processor 210 or the processor 304. The means for receiving may comprise a receiver, e.g., the receiver 254 from FIG. 2 of the user terminal 120, or the receiver 312 from FIG. 3 of the wireless device 302. The means for determining may comprise an application specific integrated circuit, e.g., the processor 288 from FIG. 2 of the user terminal 120, or the processor 304. The means for deciding may comprise an application specific integrated circuit, e.g., the processor 288 or the processor 304. The means for refraining may comprise an application specific integrated circuit, e.g., the processor 288 or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
a processor configured to generate a plurality of Data Units (DUs);
a transmitter configured to transmit a multi-user multiple-input multiple-output (MU-MIMO) transmission comprising the DUs to a plurality of other apparatuses, wherein acknowledgement policies for the DUs are set to cause no more than a first apparatus of the other apparatuses to respond with an acknowledgement message, wherein the transmitter is further configured to transmit an acknowledgment request message to at least a second apparatus of the other apparatuses if the acknowledgment message from the first apparatus of the other apparatuses is received, and wherein the processor is further configured to detect a collision if the acknowledgment message is not received from the first apparatus, to increase a contention window in response to detecting the collision, and to halt transmission of the acknowledgment request message to the at least a second apparatus of the other apparatuses for a time period based on the contention window.

2. The apparatus of claim 1, wherein the acknowledgement message comprises at least one of an immediate Block Acknowledgment (BA) message or a Normal ACK message.

3. The apparatus of claim 1, wherein the acknowledgement policies for DUs associated with the apparatuses other than the first apparatus of the plurality of other apparatuses are set to no ACKs or ACKs upon request.

4. The apparatus of claim 1, wherein the processor is also configured to generate the plurality of DUs of at least one of a primary access category or secondary access categories.

5. The apparatus of claim 4, wherein:
an acknowledgement policy for a DU of the plurality of DUs of the primary access category is set for a Normal ACK, and
the acknowledgement message comprises the Normal ACK.

6. The apparatus of claim 1, wherein acknowledgement policy bits for a first of the DUs associated with the first apparatus are set to a value indicating an implicit Block Acknowledgement Request (BAR).

7. The apparatus of claim 1, wherein acknowledgement policy bits for the DUs for the apparatuses other than the first apparatus are set to a value indicating a Wait for Block Acknowledgement Request (BAR) policy.

8. The apparatus of claim 1, wherein acknowledgement policy bits for the DUs for the apparatuses other than the first apparatus of the plurality of other apparatuses are set to a value indicating a No-ACK policy.

9. The apparatus of claim 1, wherein the processor is also configured to assign at least one of the plurality of other apparatuses a position within a group; and
wherein which apparatus is the first apparatus is determined based on the position of that apparatus in the group.

10. The apparatus of claim 9, wherein the transmitter is also configured to:
transmit a Block Acknowledgement Request (BAR) message to at least one apparatus of the plurality of other apparatuses that is not assigned another position in the group.

11. The apparatus of claim 1, wherein the transmitter is also configured to:
transmit, following the MU-MIMO transmission, Block Acknowledgement Request (BAR) messages to one or more of the apparatuses other than the first apparatus of the plurality of other apparatuses.

12. The apparatus of claim 11, wherein the BAR messages are transmitted in accordance with one or more of the IEEE 802.11 family of standards.

13. The apparatus of claim 1, wherein the processor is also configured to detect that an acknowledgement from one of the apparatuses of the plurality of other apparatuses is missing, if a physical layer reception start (PHY-RXSTART) indication is not detected at the apparatus during a time period after transmission of the DUs.

14. The apparatus of claim 1, wherein the plurality of DUs comprises a plurality of Media access control Protocol Data Units (MPDUs).

15. A method for wireless communications, comprising:
generating a plurality of Data Units (DUs);
transmitting a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message;
upon receiving the acknowledgment message from the first apparatus of the apparatuses:
transmitting an acknowledgment request message to at least a second apparatus of the apparatuses in response to receiving the acknowledgment message from the first apparatus of the apparatuses; and
upon failing to receive the acknowledgment message from the first apparatus of the apparatuses:
detecting a collision,
increasing a contention window in response to detecting the collision; and
halting transmission of the acknowledgment request message to the at least a second apparatus of the apparatuses for a time period based on the contention window.

16. The method of claim 15, wherein the acknowledgement message comprises at least one of an immediate Block Acknowledgment (BA) message or a Normal ACK message.

17. The method of claim 15, wherein the acknowledgement policies for DUs associated with the apparatuses other than the first apparatus are set to no ACKs or ACKs upon request.

18. The method of claim 15, further comprising:
generating the plurality of DUs of at least one of a primary access category or secondary access categories.

19. The method of claim 18, wherein:
an acknowledgement policy for a DU of the plurality of DUs of the primary access category is set for a Normal ACK, and
the acknowledgement message comprises the Normal ACK.

20. The method of claim 15, wherein acknowledgement policy bits for a first of the DUs associated with the first apparatus are set to a value indicating an implicit Block Acknowledgement Request (BAR).

21. The method of claim 15, wherein acknowledgement policy bits for the DUs for the apparatuses other than the first apparatus are set to a value indicating a Wait for Block Acknowledgement Request (BAR) policy.

22. The method of claim 15, wherein acknowledgement policy bits for the DUs for the apparatuses other than the first apparatus are set to a value indicating a No-ACK policy.

23. The method of claim 15, further comprising:
assigning at least one of the apparatuses a position within a group; and
wherein which apparatus is the first apparatus is determined based on the position of that apparatus in the group.

24. The method of claim 23, further comprising:
transmitting a Block Acknowledgement Request (BAR) message to at least one apparatus that is not assigned another position in the group.

25. The method of claim 15, further comprising:
transmitting, following the MU-MIMO transmission, Block Acknowledgement Request (BAR) messages to one or more of the apparatuses other than the first apparatus.

26. The method of claim 25, wherein the BAR messages are transmitted in accordance with one or more of the IEEE 802.11 family of standards.

27. The method of claim 15, further comprising:
detecting that an acknowledgement from one of the apparatuses is missing, if a physical layer reception start (PHY-RXSTART) indication is not detected during a time period after transmission of the DUs.

28. The method of claim 15, wherein the plurality of DUs comprises a plurality of Media access control Protocol Data Units (MPDUs).

29. An apparatus for wireless communications, comprising:
means for generating a plurality of Data Units (DUs);
means for transmitting a multi-user multiple-input multiple-output (MU-MIMO) transmission comprising the DUs to a plurality of other apparatuses, wherein acknowledgement policies for the DUs are set to cause no more than a first apparatus of the plurality of other apparatuses to respond with an acknowledgement message;
means for transmitting, upon receiving the acknowledgment message from the first apparatus of the other apparatuses, an acknowledgment request message to at least a second apparatus of the other apparatuses in response to receiving the acknowledgment message from the first apparatus of the other apparatuses;

means for detecting a collision upon failing to receive the acknowledgment message from the first apparatus of the other apparatuses;

means for increasing a contention window in response to detecting the collision; and means for halting transmission of the acknowledgment request message to the at least a second apparatus of the other apparatuses for a time period based on the contention window.

30. The apparatus of claim 29, wherein the acknowledgement message comprises at least one of an immediate Block Acknowledgment (BA) message or a Normal ACK message.

31. The apparatus of claim 29, wherein the acknowledgement policies for DUs associated with the apparatuses other than the first apparatus of the plurality of other apparatuses are set to no ACKs or ACKs upon request.

32. The apparatus of claim 29, further comprising:
means for generating the plurality of DUs of at least one of a primary access category or secondary access categories.

33. The apparatus of claim 32, wherein:
an acknowledgement policy for a DU of the plurality of DUs of the primary access category is set for a Normal ACK, and
the acknowledgement message comprises the Normal ACK.

34. The apparatus of claim 29, wherein acknowledgement policy bits for a first of the DUs associated with the first apparatus are set to a value indicating an implicit Block Acknowledgement Request (BAR).

35. The apparatus of claim 29, wherein acknowledgement policy bits for the DUs for the apparatuses other than the first apparatus of the plurality of other apparatuses are set to a value indicating a Wait for Block Acknowledgement Request (BAR) policy.

36. The apparatus of claim 29, wherein acknowledgement policy bits for the DUs for the apparatuses other than the first apparatus of the plurality of other apparatuses are set to a value indicating a No-ACK policy.

37. The apparatus of claim 29, further comprising:
means for assigning at least one of the plurality of other apparatuses a position within a group; and
wherein which apparatus is the first apparatus is determined based on the position of that apparatus in the group.

38. The apparatus of claim 37, wherein the means for transmitting is further configured to:
transmit a Block Acknowledgement Request (BAR) message to at least one apparatus of the plurality of other apparatuses that is not assigned another position in the group.

39. The apparatus of claim 29, wherein the means for transmitting is further configured to:
transmit, following the MU-MIMO transmission, Block Acknowledgement Request (BAR) messages to one or more of the apparatuses other than the first apparatus of the plurality of other apparatuses.

40. The apparatus of claim 39, wherein the BAR messages are transmitted in accordance with one or more of the IEEE 802.11 family of standards.

41. The apparatus of claim 29, further comprising:
means for detecting that acknowledgement from one of the apparatuses of the plurality of other apparatuses is missing, if a physical layer reception start (PHY-RX-START) indication is not detected at the first apparatus during a time period after transmission of the DUs.

42. The apparatus of claim 29, wherein the plurality of DUs comprises a plurality of Media access control Protocol Data Units (MPDUs).

43. A non-transitory computer-readable medium encoded with instructions executable to:
generate a plurality of Data Units (DUs);
transmit a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message;
upon receiving the acknowledgment message from the first apparatus of the apparatuses: transmit an acknowledgment request message to at least a second apparatus of the apparatuses in response to receiving the acknowledgment message from the first apparatus of the apparatuses; and
upon failing to receive the acknowledgment message from the first apparatus of the apparatuses:
detect a collision,
increase a contention window in response to detecting the collision; and
halt transmission of the acknowledgment request message to the at least a second apparatus of the apparatuses for a time period based on the contention window.

44. An access point, comprising:
at least one antenna;
a processor configured to generate a plurality of Data Units (DUs); and
a transmitter configured to transmit, via the at least one antenna, a multi-user multiple-input multiple-output (MU-MIMO) transmission comprising the DUs to a plurality of apparatuses, wherein acknowledgement policies for the DUs are set to cause no more than a first apparatus of the apparatuses to respond with an acknowledgement message,
wherein the transmitter is further configured to transmit an acknowledgment request message to at least a second apparatus of the other apparatuses if the acknowledgment message from the first apparatus of the other apparatuses is received, and wherein the processor is further configured to detect a collision if the acknowledgment message is not received from the first apparatus, to increase a contention window in response to detecting the collision, and to halt transmission of the acknowledgment request message to the at least a second apparatus of the apparatuses for a time period based on the contention window.

* * * * *